(12) United States Patent
Schmeichel (10) Patent No.: US 9,260,139 B2
(45) Date of Patent: Feb. 16, 2016

(54) TONNEAU COVER HAVING A DRAW CORD (71) Applicant: Agri-Cover, Inc., Jamestown, ND (US)

(72) Inventor: Charles M. Schmeichel, Jamestown, ND (US)

(73) Assignee: Agri-Cover, Inc., Jamestown, ND (US)

( * ) Notice: Subject to any disclaimer, the term of this patent is extended or adjusted under 35 U.S.C. 154(b) by 0 days.

(21) Appl. No.: 14/696,565

(22) Filed: Apr. 27, 2015

(65) Prior Publication Data

US 2015/0225022 A1 Aug. 13, 2015

Related U.S. Application Data (63) Continuation of application No. 14/483,379, filed on Sep. 11, 2014, now Pat. No. 9,056,542, which is a continuation of application No. 13/599,849, filed on Aug. 30, 2012, now Pat. No. 8,857,887.

(60) Provisional application No. 61/529,715, filed on Aug. 31, 2011.

(51) Int. Cl.
*B62D 27/06* (2006.01)
*B60J 7/10* (2006.01)
(Continued)

(52) U.S. Cl.
CPC ............. *B62D 27/06* (2013.01); *B60J 7/104* (2013.01); *B60P 7/04* (2013.01); *B62D 33/04* (2013.01)

(58) Field of Classification Search
CPC .......... B62D 27/06; B62D 33/04; B60J 7/104
USPC ....................................... 296/100.15, 100.16
See application file for complete search history.

(56) References Cited

U.S. PATENT DOCUMENTS

| 1,500,091 A | 7/1924 | Weiske et al. |
| 2,581,985 A * | 1/1952 | Tuerk ....................... B60J 7/104 160/400 |
| 2,649,330 A | 8/1953 | Schamel et al. |

(Continued)

FOREIGN PATENT DOCUMENTS

| CN | 1827424 A | 9/2006 |
| WO | WO 99/36290 | 7/1999 |

OTHER PUBLICATIONS

United States Patent and Trademark Office, Prosecution History of U.S. Appl. No. 11/045,857.

(Continued)

*Primary Examiner* — Pinel Romain
(74) *Attorney, Agent, or Firm* — Moore & Hansen, PLLC; Robert C. Freed (57) ABSTRACT

A tonneau cover assembly for attachment about a top of a perimeter of a cargo box of a pickup truck. The tonneau cover assembly including a cover, a support frame and a securing plate having at least one locking member. The securing plate preferably includes two locking members each of which is biased toward a first position in which the respective locking members prevent the securing plate from disengaging from a closed position with respect to the support frame. The locking members are preferably interconnected to opposite ends of a draw cord. The draw cord preferably has a pull loop so that the draw cord can be pulled in order to draw the respective locking members away from the respective first positions, so that each locking member resides in a second position, which allows the securing plate to disengage from the support frame.

34 Claims, 7 Drawing Sheets

(51) Int. Cl.
*B60P 7/04* (2006.01)
*B62D 33/04* (2006.01)

(56) References Cited

U.S. PATENT DOCUMENTS

| | | | |
|---|---|---|---|
| 2,889,171 A * | 6/1959 | Morris | B60J 7/104 |
| | | | 105/377.02 |
| 2,906,323 A | 9/1959 | Macy | |
| 2,969,284 A | 1/1961 | Ambli | |
| 3,330,225 A * | 7/1967 | Barry | B61D 39/00 |
| | | | 105/377.02 |
| 3,563,594 A * | 2/1971 | London | B60J 11/025 |
| | | | 105/324 |
| 3,923,334 A | 12/1975 | Key | |
| 4,036,521 A | 7/1977 | Clenet | |
| 4,272,119 A | 6/1981 | Adams | |
| 4,273,377 A | 6/1981 | Alexander | |
| 4,730,865 A | 3/1988 | Iwata | |
| 4,757,854 A | 7/1988 | Rippberger | |
| 4,838,602 A | 6/1989 | Nett | |
| 4,923,240 A | 5/1990 | Swanson | |
| 4,991,640 A | 2/1991 | Verkindt et al. | |
| 5,026,109 A * | 6/1991 | Merlot, Jr. | B60J 7/062 |
| | | | 160/84.06 |
| 5,040,843 A | 8/1991 | Russell et al. | |
| 5,058,652 A | 10/1991 | Wheatley et al. | |
| 5,067,766 A | 11/1991 | Lovaas | |
| 5,076,338 A | 12/1991 | Schmeichel et al. | |
| 5,174,353 A | 12/1992 | Schmeichel et al. | |
| 5,207,262 A | 5/1993 | Rushford | |
| 5,251,951 A | 10/1993 | Wheatley | |
| 5,263,761 A | 11/1993 | Hathaway et al. | |
| 5,350,213 A | 9/1994 | Bernardo | |
| 5,364,154 A | 11/1994 | Kaiser | |
| 5,385,377 A * | 1/1995 | Girard | B60J 7/104 |
| | | | 296/100.16 |
| 5,427,428 A | 6/1995 | Ericson et al. | |
| 5,480,206 A | 1/1996 | Hathaway et al. | |
| 5,487,585 A | 1/1996 | Wheatley | |
| 5,522,635 A | 6/1996 | Downey | |
| 5,540,475 A | 7/1996 | Kersting et al. | |
| 5,553,652 A | 9/1996 | Rushford | |
| 5,584,521 A | 12/1996 | Hathaway et al. | |
| 5,595,417 A | 1/1997 | Thoman et al. | |
| 5,655,808 A | 8/1997 | Wheatley | |
| 5,688,017 A | 11/1997 | Bennett | |
| 5,758,922 A | 6/1998 | Wheatley | |
| 5,765,902 A | 6/1998 | Love | |
| 5,775,765 A | 7/1998 | Kintz | |
| 5,788,315 A | 8/1998 | Tucker | |
| 5,860,691 A | 1/1999 | Thomsen et al. | |
| 5,906,407 A | 5/1999 | Schmeichel | |
| 5,921,603 A | 7/1999 | Karrer | |
| 6,024,401 A | 2/2000 | Wheatley et al. | |
| 6,024,402 A | 2/2000 | Wheatley | |
| 6,030,021 A | 2/2000 | Ronai | |
| 6,053,556 A | 4/2000 | Webb | |
| 6,053,558 A | 4/2000 | Weldy et al. | |
| 6,124,777 A | 9/2000 | Snider | |
| 6,209,366 B1 | 4/2001 | Zagoroff | |
| 6,234,561 B1 | 5/2001 | Huotari | |
| 6,257,306 B1 | 7/2001 | Weldy | |
| 6,257,647 B1 | 7/2001 | Ninness et al. | |
| 6,258,311 B1 | 7/2001 | Jens et al. | |
| 6,264,266 B1 | 7/2001 | Rusu et al. | |
| 6,427,500 B1 | 8/2002 | Weinerman et al. | |
| 6,439,640 B1 | 8/2002 | Wheatley | |
| 6,499,791 B2 | 12/2002 | Wheatley | |
| 6,543,835 B2 | 4/2003 | Schmeichel et al. | |
| 6,568,740 B1 | 5/2003 | Dimmer | |
| 6,575,518 B1 | 6/2003 | Henning | |
| 6,575,520 B1 | 6/2003 | Spencer | |
| 6,607,234 B1 | 8/2003 | Schmeichel | |
| 6,640,348 B1 | 11/2003 | Clune et al. | |
| 6,672,644 B2 | 1/2004 | Schmeichel | |
| 6,719,353 B1 | 4/2004 | Isler et al. | |
| 6,752,449 B1 | 6/2004 | Wheatley | |
| 6,808,220 B2 | 10/2004 | Wheatley | |
| 6,808,221 B2 | 10/2004 | Wheatley | |
| 6,811,203 B2 | 11/2004 | Wheatley | |
| 6,814,388 B2 | 11/2004 | Wheatley | |
| 6,814,389 B2 | 11/2004 | Wheatley | |
| 6,851,738 B1 | 2/2005 | Schmeichel et al. | |
| 6,893,073 B2 | 5/2005 | Wheatley | |
| 6,948,761 B2 | 9/2005 | Haack et al. | |
| 7,066,524 B2 | 6/2006 | Schmeichel et al. | |
| 7,104,586 B2 | 9/2006 | Schmeichel et al. | |
| 7,172,008 B2 | 2/2007 | Vanbenschoten et al. | |
| 7,258,387 B2 | 8/2007 | Weldy | |
| 7,334,830 B2 | 2/2008 | Weldy | |
| 7,427,095 B2 | 9/2008 | Wheatley | |
| 7,484,790 B2 | 2/2009 | Wheatley | |
| 7,537,264 B2 | 5/2009 | Maimin et al. | |
| 7,607,714 B2 | 10/2009 | Wheatley | |
| 7,621,582 B2 | 11/2009 | Schmeichel et al. | |
| 7,628,442 B1 | 12/2009 | Spencer et al. | |
| 7,658,578 B1 * | 2/2010 | Weibl | B60J 7/104 |
| | | | 296/100.16 |
| D620,877 S | 8/2010 | Rusher et al. | |
| 7,828,361 B1 | 11/2010 | Spencer | |
| 8,083,281 B2 | 12/2011 | Schmeichel et al. | |
| 8,328,267 B2 | 12/2012 | Schmeichel et al. | |
| 8,336,946 B2 | 12/2012 | Schrader et al. | |
| 8,439,423 B2 | 5/2013 | Schmeichel et al. | |
| 2001/0020792 A1 | 9/2001 | Huotari | |
| 2002/0022108 A1 | 2/2002 | Krantz et al. | |
| 2002/0038962 A1 | 4/2002 | Perez | |
| 2002/0096910 A1 | 7/2002 | Schmeichel et al. | |
| 2003/0197394 A1 | 10/2003 | Dimmer | |
| 2004/0212212 A1 | 10/2004 | Spencer et al. | |
| 2004/0245800 A1 | 12/2004 | Wheatley | |
| 2005/0241260 A1 | 11/2005 | Wheatley | |
| 2007/0029695 A1 | 2/2007 | Gallant et al. | |
| 2008/0100088 A1 | 5/2008 | Calder et al. | |
| 2009/0127881 A1 | 5/2009 | Spencer | |
| 2009/0243331 A1 | 10/2009 | Spencer et al. | |
| 2010/0019529 A1 | 1/2010 | Alston | |
| 2010/0019530 A1 | 1/2010 | Schmeichel et al. | |
| 2010/0133872 A1 | 6/2010 | Kosinski | |
| 2010/0148534 A1 | 6/2010 | Kneifl et al. | |
| 2011/0169296 A1 | 7/2011 | Schrader et al. | |
| 2012/0049568 A1 | 3/2012 | Wolf et al. | |
| 2012/0248817 A1 | 10/2012 | Miller | |

OTHER PUBLICATIONS

United States Patent and Trademark Office, Prosecution History of U.S. Appl. No. 13/687,749.
United States Patent and Trademark Office, Prosecution History of U.S. Appl. No. 14/483,379.
Photocopy of a picture taken in Sep. 1999, of a tonneau cover product shown at the Big Iron Farm Show in Fargo, ND, by Shur-Co, Inc. of Yankton, SD.
Drawing of a tonneau cover product shown in Sep. 1999, at the Big Iron Farm Show in Fargo, ND, by Shur-Co, Inc., of Yankton, SD.
Shur-Co, Inc., Oct. 1999, owner's manual.
Shur-Co, Inc., Dec. 2000, owner's manual.
Access© Roll-up Cover Owner's Manual, 1996, Agri-Cover, Inc., 8 pages.
The Velcro Companies, "Soft Hardware Fasteners", *Product Information Guide*, published at least as early as Aug. 26, 2005, first page, The Velcro Companies, United States.
Velcro USA Inc., "Soft Hardware Fasteners," *Product Information Guide*, May 2000, Velcro Industries B.V., United States.

* cited by examiner

TONNEAU COVER HAVING A DRAW CORD

RELATED APPLICATIONS

The present application is a continuation of U.S. patent application Ser. No. 14/483,379, filed Sep. 11, 2014, which is a continuation of U.S. patent application Ser. No. 13/599,849, filed Aug. 30, 2012, now U.S. Pat. No. 8,857,887, issued Oct. 14, 2014, which claimed benefit under 35 U.S.C 119(e) of U.S. Provisional Application Ser. No. 61/529,715, filed Aug. 31, 2011, each of which is hereby incorporated herein by reference.

FIELD OF THE INVENTION

Tonneau cover assemblies, particularly, tonneau cover assemblies including a cover secured to a securing plate having locking members to engage the securing plate to side rails attached to sidewalls of the cargo box. The cover assemblies further including a draw cord interconnected to the respective locking members.

DESCRIPTION OF THE RELATED ART

Numerous protective cover assemblies for preventing rain, debris and wind from damaging or disrupting the contents of a pickup truck bed are currently available. Some covers are made of some sort of fabric, often a fabric coated with a polymeric material, which is detachably fastenable to a rigid frame so as to enclose and protect the pickup truck cargo box. The covering materials used are generally stretchable to the extent that once they are in a position to be secured, they are pulled taut and then attached to the frame by numerous methods such as snaps, grommets, or hook-and-loop fasteners, stretcher bars and the like.

Typical protective cover assembly frames include a pair of elongated side rails that are secured to the sidewalls of the cargo box. Known side rails often include a component of hook or loop strip fastener secured to the side rail, typically within a horizontal channel (see, e.g., U.S. Pat. Nos. 4,036, 521; 4,991,640; 6,752,449 and U.S. Patent Application Pub. No. 2004/0212212 A1).

The present invention provides improvements which address limitations associated with the prior art.

SUMMARY OF THE INVENTION

A preferred embodiment relates to a tonneau cover assembly that includes a cover that can be operatively secured to two side rails, each of which are secured to one of the respective sidewalls of a pickup truck cargo box. In preferred embodiments the sides of the cover are secured with magnetic fastener elements for quick engagement. The magnetic fastener elements can be of many different configurations and can include at least one magnet positioned on each side of the cover and a corresponding ferromagnetic material on the respective side rails. In alternate embodiments, it will be appreciated that this can be reversed by securing the ferromagnetic material, such as a strip of galvanized steel, to the cover and securing the magnets to the respective side rails. The side rail can be made of a ferromagnetic material, or alternatively, a ferromagnetic material can be secured to a receiving surface on each side rail or preferably within a channel for receiving a slat made of ferromagnetic material or a slat to which ferromagnetic material is attached. In preferred embodiments, the tonneau cover of the present invention will include a tonneau cover assembly for securing over a cargo box of a pickup truck having two side rails for securing to the cargo box; wherein the two side rails each include a receiving surface and a ferromagnetic material located on the receiving surface; and a flexible cover having two sides and two ends; the flexible cover further including a plurality of magnets secured on each of the two sides; wherein each of the plurality of magnets removably secure the flexible cover to ferromagnetic material of each of the side rails; wherein each side rail will preferably include a channel having a first edge and a second edge, the innermost edge preferably including a ridge; wherein the side rail is preferably inclined such that the innermost edge is higher than the outermost edge; wherein the respective magnets can be secured against the respective ridge so that the respective ridge will resist movement of the respective sides of the flexible cover in the direction of the other side rail as the respective magnets slide up along the surface of the channel and such that the ridge resists further movement of the respective magnets in the direction of the other side rail.

In further preferred embodiments, the tonneau cover assembly can include two securing plates or end plates attached to opposite lateral ends of the flexible cover. The front end plate is secured to the side rails at a forward end of the cargo box and the rear end plate is secured to the side rails at the tailgate end of the cargo box to form a securing frame in a manner similar to that disclosed in U.S. Pat. Nos. 5,076,338 and 6,543,835, each of which is incorporated herein by reference.

During development of the present invention, the inventor discovered that, when a preferred tonneau cover of the present invention is secured to the forward end and drawn over the top of the side rails, so that the rear end plate can be engaged with securing plate engagement members on each of the respective side rails, the magnetic fasteners can slide somewhat with respect to the ferromagnetic material. This sliding provides for horizontal adjustments of the flexible cover with respect to the side rails such that the cover can be tautly drawn over the securing frame when one end plate is secured to the side rails and the opposite end plate is engaged with respective side rails and pivoted into the closed position. It will be appreciated that the appearance of a flexible cover that is tautly drawn over a cargo box is desirable to consumers and that a tautly drawn flexible cover diminishes the possibility that rain water or snow will pool in low spots over the middle of the cargo box with such flexible covers, which is also believed to be undesirable. Furthermore, the ability of the cover to slide with respect to the respective side rails is beneficial as this movement does not damage the magnetic faster, as would happen when the fastener is multi-directional hook and loop fastener or the like. A further advantage of embodiments of the present invention is that the magnetic fasteners automatically engage with the side rail, unlike the traditional use of hook and loop fasteners, which sometimes require that the user run their hand along the hook and loop fasteners after the cover is draped over the cargo box in order to sufficiently engage the fasteners.

The side rails of this and other embodiments will preferably include at least one retaining portion to retain a slat that can extend generally the length of the side rail, although the slat can be affixed with adhesives and preferably does not require such a retaining portion. In preferred embodiments, the side rails will include two complimentary retaining portions on opposite edges of the respective side rail. In preferred embodiments, the respective side rail will also have an inclined portion and at least one retaining portion proximate the top edge of the inclined portion. More preferably, there will be a retaining portion proximate each respective edge of the inclined portion. In preferred embodiments, the inclined portion will include a receiving surface and may also include two retaining portions proximate each of the respective edges to define a channel. In preferred embodiments, the inclined portion further includes a ridge extending generally along the length of the side rail proximate an innermost edge of the inclined portion closest to a center of the cargo box, such that when the cover is positioned over the cargo box, the magnets proximate each of the respective sides of the cover can be secured against the respective ridges so that the respective ridges will resist movement of the respective sides of the cover in the direction of the opposing longitudinal side of the flexible cover.

Other mechanisms for providing a magnetic strip or ferromagnetic materials include at least one ferromagnetic insert or slat designed to reside in the channel with the first fastener component. Alternatively, a ferromagnetic material can be fastened to the receiving surface of the inclined portion with adhesives, screws, grommets or the like.

Further preferred embodiments include fastening systems including a combination of hook and loop fastener and magnetic fasteners. It has been found that in such embodiments, magnets can be used to draw the respective sides of the cover down into the respective side rails so as to press the respective loop fastening element against the respective hook fastening element, so that the respective fastening elements will engage effectively without the further need to run one's hand over the cover to engage the hook and loop fastening elements. This automatic engagement saves time and wear and tear on the hook and loop fastening elements, thereby extending the useful life of the cover as many tonneau cover users do not take the time to engage the hook and loop fastener elements properly, thus ultimately resulting in damage to the hook and loop fastener elements as well as potentially damaging the cover itself if it were to suddenly flop open. In preferred embodiments, the hook and loop fastener elements would alternate along the length of the side rail and/or the cover with magnetic fastener elements (i.e., magnets and ferromagnetic materials to which the magnets will be attracted.)

In preferred embodiments having a cover that is secured to the side rails with a combination of hook and loop fasteners and magnetic fasteners, the side rail does not necessarily have retaining portions, a ridge or the like. In these embodiments, the hook and loop fasteners generally prevent the magnetic fasteners from sliding upwardly on an inclined side rail and the magnetic fasteners provide for some lateral movement of the flexible cover such that wear and tear on the hook and loop fastener is still reduced. In even further preferred embodiments, the hook fastener is a directional hook fastener element having a plurality of hooks that generally all face the same direction such that the hook fastener will engage a corresponding loop fastener on the flexible cover or vice versa in only one direction. The directional hook fastener element is preferably arranged such that the hooks of the directional hook fastener will only engage in one direction. In preferred embodiments the directional hook fastener element is attached to the respective side rail and it will preferably face the end of the cover proximate the tailgate such that the respective hooks are open toward the tailgate. Alternately, the hooks are attached to the sides of the cover and the hooks will face (or be open toward) the front end of the cover proximate the front of the cargo box when the cover is attached to the truck.

Preferred tonneau cover assemblies further include an end plate having a cord or strap interconnecting two spring biased locking members. The cord further preferably includes a connecting portion, a loop having two ends that are connected to the connecting portion. The loop preferably extends outwardly from the connecting portion and can be pulled to move each of the respective locking members from a first position in which the two respective locking members prevent the end plate from disengaging from the respective end plate engagement members proximate each of the respective side rails to a second position in which the end plate can disengage from the respective end plate engagement members. In preferred embodiments the length of connecting portion is adjustable at one end where it is doubled over on itself and interconnected by a slip clip that can slide along the connecting portion of cord or strap so that its length can be adjusted so that it can be used for different sized tonneau covers without the need for different sizing options. In further preferred embodiments, the slip clip is connectable to the end plate.

These and various other advantages and features of novelty which characterize the present invention are pointed out with particularity in the claims annexed hereto and forming a part hereof. However, for a better understanding of the invention, its advantages and objects obtained by its use, reference should be made to the drawings which form a further part hereof, and to the accompanying descriptive matter, in which there is illustrated and described a preferred embodiment of the present invention.

BRIEF DESCRIPTION OF THE DRAWINGS

In the drawings, in which corresponding reference numerals and letters indicate corresponding parts of the various embodiments throughout the several views, and in which the various embodiments generally differ only in the manner described and/or shown, but otherwise include corresponding parts.

DETAILED DESCRIPTION OF THE PREFERRED EMBODIMENTS

Figure 1:
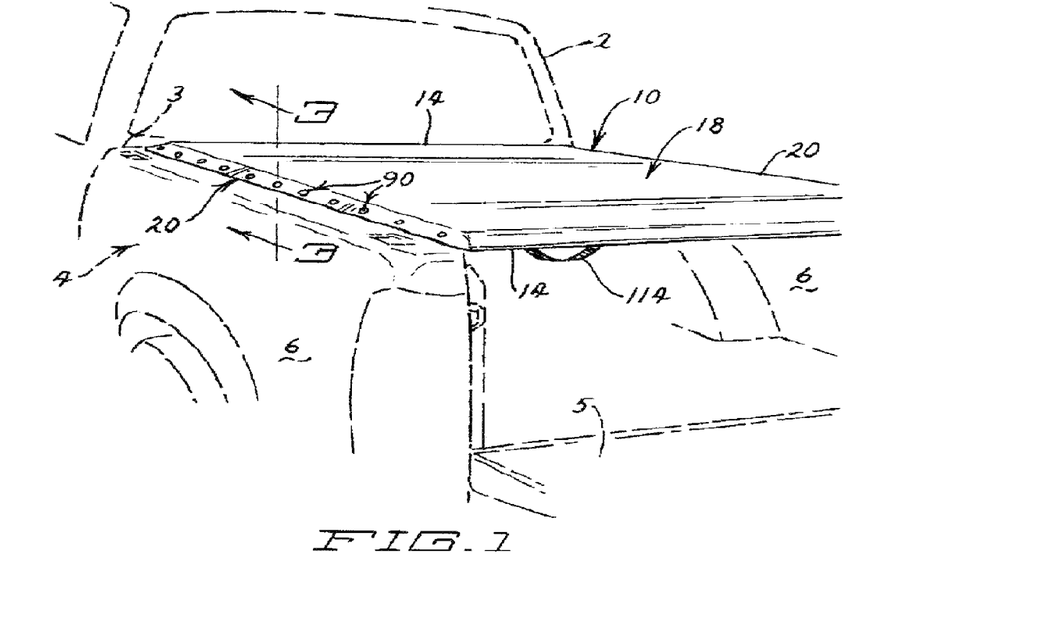
FIG. 1 is a perspective view of one preferred tonneau cover assembly 10 in a closed position.
Figure 2:
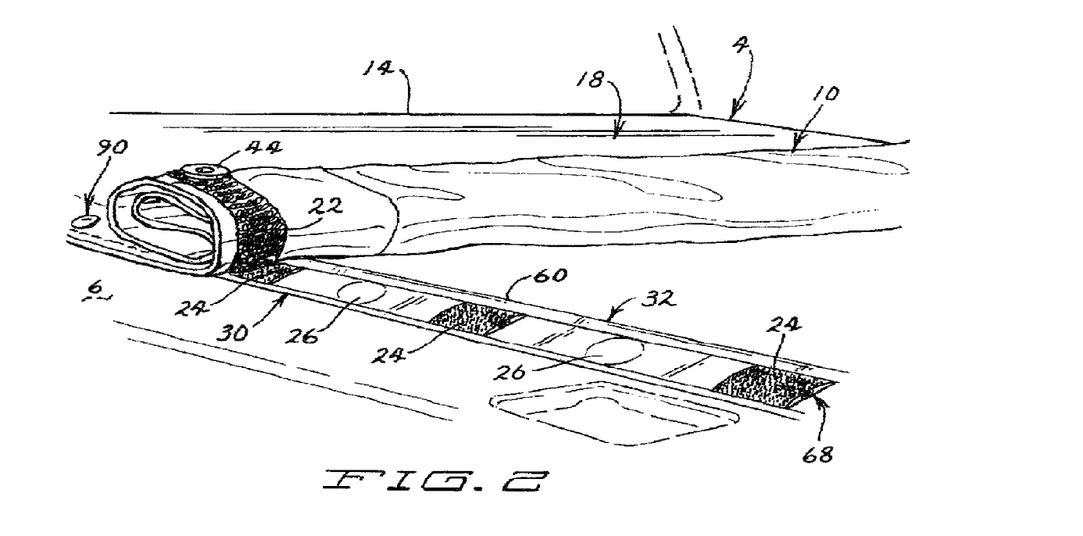
FIG. 2 is a partial, perspective view of the tonneau cover assembly 10 of FIG. 1 in a partially, open position; wherein a flexible cover 18 of the tonneau cover assembly 10 is rolled up exposing respective hook and loop and magnetic fastening elements 22, 24, 26, 44.
Figure 3:
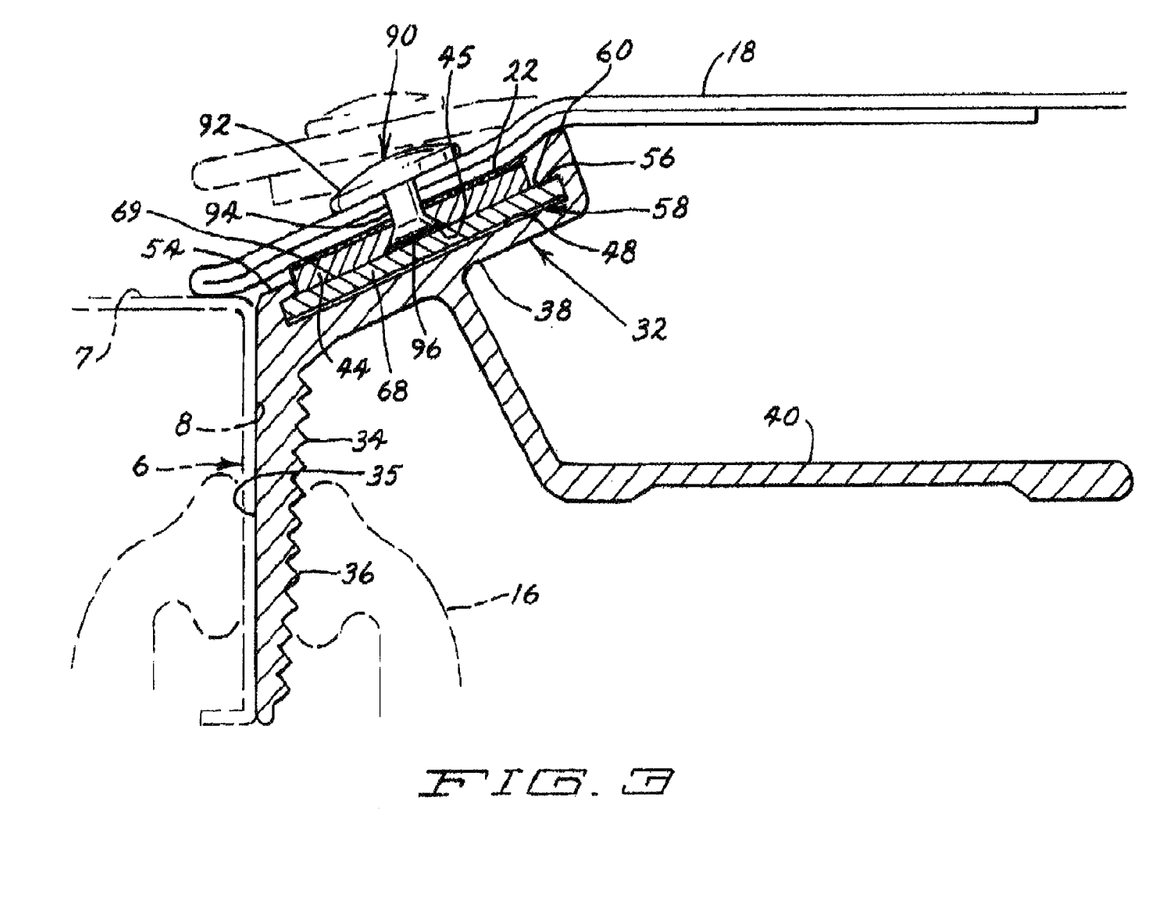
FIG. 3 is a partial, cross sectional view of the tonneau cover assembly 10 of FIGS. 1-2 as viewed along line 3-3 of FIG. 1.

Referring now to the drawings, particularly FIGS. 1-3, there is illustrated a preferred embodiment of a tonneau cover apparatus 10 attached to a pickup truck 2. The pickup truck 2 has a cargo box 4 at least partially defined by two opposing sidewalls 6, a tailgate 5 (shown in a lowered position) and a front wall 3. The tonneau cover apparatus 10 includes a cover 18. The cover 18 includes opposing longitudinal sides 20 and opposing lateral sides or ends 14, each of which is preferably secured to an end plate 70. Although the cover can be a hard cover and can be a tri-fold or other type of cover in alternate embodiments, the preferred cover shown in FIGS. 1-3 is a flexible cover 18. FIG. 1 illustrates the flexible cover 18 tautly draped over the cargo box 4 of the pickup truck 2 when the tonneau cover apparatus 10 is in a closed position. FIG. 2 partially illustrates a tonneau cover apparatus 10 in an open position when the flexible cover 18 is partially rolled up. As shown in FIG. 3, each outer sidewall 6 has a top surface 7 and an inner surface 8. The flexible cover 18 is preferably constructed of somewhat resilient fabric material that is laminated to a polyester material to give it strength, flexibility and water resistance.

The respective lateral sides 14 of the flexible cover 18 are preferably attached to respective end plates 70 (only one end plate is shown) by securing a portion of the lateral end 14 in a channel 76 (see FIG. 6) from which an end flap 15 of the lateral end 14 will preferably extend. The flexible cover 18 can be secured to a side rail assembly that includes two side rails 32 that are secured to the respective sidewalls 6 of the pickup truck 2 by securing the respective end plates 70 to the side rails 32 to form a securing frame, to which the respective end plates 70 are attached proximate respective ends of the cargo box 4, when the tonneau cover apparatus 1 is closed (see also, FIGS. 6-7B). Each side rail 32 preferably includes an inclined portion 38 having a receiving surface 48 that resides generally in an inclined plane that is consistent with the receiving surface. The preferred side rail 32 further includes a connecting member 40 that extends downwardly and away from the inclined portion 38 at an angle of about 90° relative to the inclined plane.

Each of the preferred side rails 32, include a securing portion 34 having an engaging surface 35 that is preferably secured to an inner surface 8 of a respective sidewall 6 with, for example, a series of clamps 16 positioned along the side rail 32. Preferably, in embodiments where the securing portion 34 is secured to the respective sidewall 6 with clamps 16, the securing portion 34 has a grooved surface 36 to enhance the grip of the clamp 16.

Referring now particularly to FIG. 3, showing the preferred side rail 32 in lateral cross-section, the side rail 32 is arranged and configured in accordance with the teachings of U.S. Pat. No. 7,815,329, the disclosure of which is hereby incorporated by reference.

In certain embodiments, the inclined portion 38 has a receiving surface 48 and proximal and distal retaining portions 54, 56, that cooperate to form a channel 58. In various embodiments, only one retaining portion 56 and/or a ridge 60 will be included proximate the top edge of the receiving surface. In other various embodiments, as discussed herein, the retaining portions 54, 56 can be omitted. Within the channel 58 or, alternatively, simply on the receiving surface 48, magnetic fasteners can be releasably secured for securing the cover 18 over the cargo box 4. In preferred embodiments, the magnets 44 will be coated with or preferably fully enclosed within a coating of a material that will either prevent or at least minimize the degree to which the magnets will rust. In preferred embodiments, this material will be selected from the group consisting of paint, lacquer, epoxy, plastic, ceramic or the like. In preferred embodiments, the magnets are SWP-L or RX034DCSPC-BLK plastic coated magnets from K&J Magnetics, Inc. Alternatively, M34×18plasDI magnets from Apex Magnets, a division of Emovendo, LLC, can be used. Preferred magnets will have a pull force magnet to steel plate of between about 5 to about 12 pounds, more preferably, between about 7 to about 10 pounds.

One preferred tonneau cover assembly 10 includes corresponding hook and loop fastening elements 22, 24. In certain preferred embodiments, hook fastener 22 is secured to the longitudinal edges 20 of the cover 18 and a plurality of loop fastening sections or portions 24 are secured to the receiving surface of the side rail 32. In other preferred embodiments, the hook fastener is secured to the receiving surface of the side rail and the loop fastener is secured to the cover 18. In various embodiments, the loop fastening element portions 24 can be secured to an upper surface 69 of a slat 68 that is inserted into the channel 58. In such embodiments, as are shown in FIGS. 1-3, the cover 18 can further include magnets 44 intermittently spaced on the first component of hook and loop secured to the cover 18. In such embodiments, the slat 68 will be made of ferromagnetic material, such as steel, that will attract the magnets 44. In certain preferred embodiments (not shown) the corresponding ferromagnetic material could be strips of material secured on the upper surface 69 of the slat 68 such that the magnets can secure the cover 18 to the respective side rails 32. In such embodiments, the strip can be made of painted steel, galvanized steel or painted galvanized steel to protect against corrosion. Alternatively, the receiving surface 48 of the side rails 32 can be made of a ferromagnetic material selected from a group consisting of steel, painted steel, galvanized steel, plastic coated steel and the like. In the most preferred embodiments, the magnets 44 and/or ferromagnetic material are rust resistant, either because the magnets are coated or encased within paint, lacquer, plastic, ceramic or the like.

In various preferred embodiments, as illustrated in FIGS. 1-3, the magnetic fasteners 44 preferably include an aperture 45 which allows the magnets 44 to be secured to the cover 18 with respective caps 90. The preferred cap 90 includes a head 92, a connecting portion 94 and a distal portion 96, wherein the connecting portion 94 connects the distal portion 96 to the head 92 and the distal portion 96 has a larger diameter than the connector portion 94 so that the distal portion 96 cannot pass through the aperture 45 in the magnet 44, allowing the cap 90 to secure the magnet 44 to the respective side 20 of the cover 18. To secure the magnet 44 to the cover 18, the connecting portion 94 is inserted through the aperture 45 in the magnetic fastener 44 before the end of the connecting portion 94 is enlarged (the connecting portion 94 is not shown before the distal portion is enlarged) and the distal portion 96 is then compressed against a forming device (not shown) such that distal portion flares out and retains the magnetic fastener 44 on the flexible cover 18 in a manner similar to the way a grommet is used to secure separate parts together.

Figure 4:
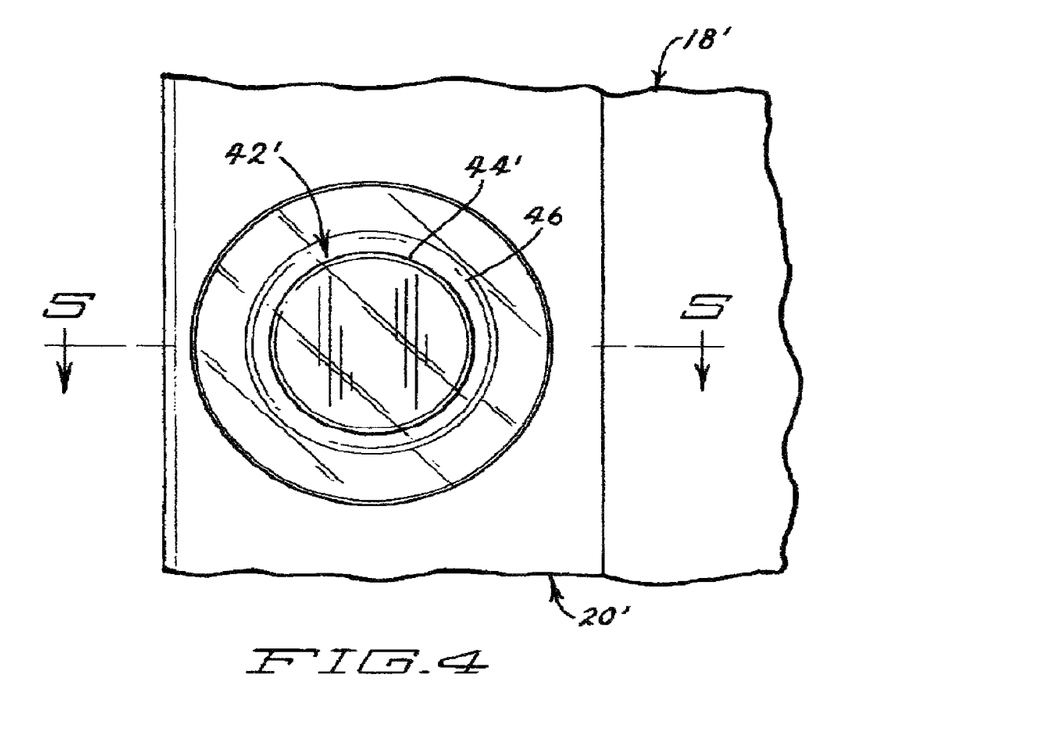
FIG. 4 is a partial, bottom view of a magnetic fastener connector assembly 42', the connector assembly 42' including a magnet 44' and a plastic enclosure 46' secured to the flexible cover 18'; wherein a plurality of magnetic fastener connector assemblies 42' can be secured to the tonneau cover assembly 10 of FIG. 1.
Figure 5:
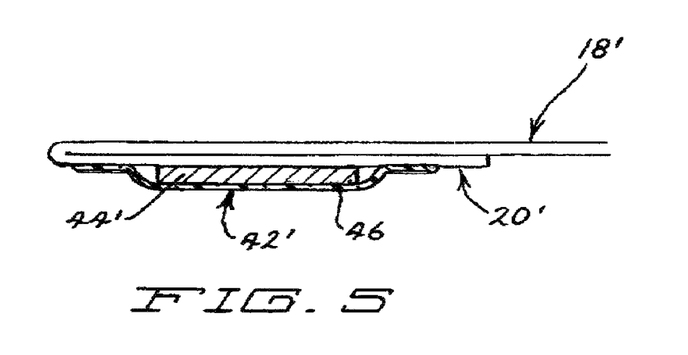
FIG. 5 is a cross-sectional view of the flexible cover 18' and connector assembly 42' of FIG. 4 as viewed along lines 5-5.

In alternate preferred embodiments, as generally illustrated in FIGS. 4-5, the magnetic fasteners 44' are secured to the cover 18' by providing a connector assembly 42' including a magnet 44' enclosed in a plastic enclosure 46'. Each longitudinal edge or side 20' of the cover 18' is preferably folded over to reinforce the edge 20', then a plurality of connector assemblies 42' are heat or radio frequency (RF) welded to the bottom side of the folded cover edge 20' to secure the connector assembly to the bottom side of the cover 18'. It will be understood that the connector assembly 42' can be secured to the cover 18' in many other ways including adhesive and sewing, for example. As will also be understood, the plastic enclosure 46' and the magnets 44' are preferably selected such that the magnets 44' will be able to secure the cover 18' to the respective side rail 32 (see, FIG. 2). In yet other alternate embodiments (not shown), the magnets can be secured to the receiving surface of the side rail and small strips of ferromagnetic material can be secured to the respective sides of the cover, preferably sewn into the respective sides of the cover or slipped into pockets sewn into the respective sides of the cover. In these instances, the magnets and the strips of ferromagnetic material can be alternated with hook and loop fasteners so that the respective sides of the cover will be alternately secured to the receiving surface of the respective side rails by a magnet attaching to a ferromagnetic strip and a hook or loop fastener attaching to a reciprocating hook or loop fastener. In these embodiments, the cover 18' is preferably one that is flexible and made of vinyl.

As shown in FIG. 3, a ridge 60 can be used in conjunction with the retaining portions 54, 56 to secure the magnetic fastener 44, 44' within the channel 58. It will be appreciated that ridge 60, retaining portions 54, 56 and channel 58 will not be necessary and can be omitted from side rail 32 if magnetic fastening elements (i.e. ferromagnetic material or strips of material 26 and the magnets 44, 44') are used in combination with reciprocating hook and loop fastening elements 22, 24. The hook and loop fastening elements 22, 24 will provide some resistance to prevent the magnets 44, 44' from sliding upward with respect to the slant of the side rail receiving surface, or toward the center of the cover, and off of the side rail 32. In such embodiments, the magnetic attraction of the magnets 44, 44' to the ferromagnetic material 26 has gripping power to hold the magnets 44, 44' to the ferromagnetic material 26, but the magnet 44, 44' can slide along the surface of the ferromagnetic material 26 and will do so if force is applied to the cover 18 that is sufficient to drag the respective magnet 44 along the surface of the ferromagnetic material 26. This can result in disengagement of the magnets 44 from the ferromagnetic material because it is easier for the magnets to slide to the edge of the ferromagnetic material and then off of it than it is to pull the magnets directly away from the ferromagnetic material at a ninety degree angle to the surface of such a material. The use of reciprocating hook and loop fastener elements 22, 24 in conjunction with magnetic fastening elements 26, 44, 44' creates a synergy between the two respective sets of fastening elements, wherein the magnets 44, 44' have great attractive power to draw the sides of the cover against the respective side rails when the respective side rails include ferromagnetic material 26. As mentioned above, the magnets will slide along the surface of such material and even off of the surface if the magnet is not prevented from doing so, but the reciprocating hook and loop fastener elements will act to prevent the magnets from sliding, but do not have the attractive gripping power of the magnets for the ferromagnetic material. The combination of the magnetic fastening elements and the reciprocating hook and loop fastener elements adds a synergy to the system for securing the sides 20 of the cover 18 to the respective side rails 32, because the magnets draw the reciprocating hook and loop fastening elements together without requiring force from the outside to move them together and, as mentioned, the hook and loop fastening elements prevent the magnets from sliding along the surface of the ferromagnetic material, as the magnets would do were it not for the hook and loop fastening elements that prevent this sliding. In this way, the owner is not required to press the edge of the cover down onto the side rail to force the respective hook and loop fastening elements to engage one another as traditional roll-up cover owners have had to do in the past in the absence of the force of magnetic attraction that the inventor has discovered will address this issue. Similarly, the hook and loop fastening elements will work together when engaged to prevent the magnetic fastening elements from sliding with respect to one another when the magnetic fastening elements are engaged.

It will be appreciated that this synergy, between the use of both magnetic fastening elements (i.e., magnets and ferromagnetic materials) and hook and loop fastening elements will be helpful, especially when an alternate side rail (not shown) is used that does not have a channel or ridge retaining portions. While these aspects such as the retaining portions 54, 56 of the preferred side rails shown in FIGS. 1-3 are desirable to secure a slat 68, they are not required if both the magnetic fastening elements and the hook and loop fastening elements are used together or in conjunction with one another.

In one preferred embodiment, the channel 58 can be used to secure the slat 68, which can be made of ferromagnetic material or can retain either a strip of ferromagnetic material 26 (not shown) on its upper surface 69 or a strip or component of reciprocating hook and loop fastener 22, 24 or a combination thereof on such surface. The slat 68 can be secured to the receiving surface 48 with an adhesive, solder, rivets, grommets, screws or the like, or it can be sized to friction fit in the channel 58. Alternatively, the ferromagnetic material 26 and component of hook and loop fastener 22, 24 can be secured either directly to the receiving surface 48 or to the slat 68. In alternate embodiments, the slat 68 can be made of a ferromagnetic material and not include any element of hook and loop fastener, in which case the hook and loop fastener would not be present to prevent the respective magnets 44, 44' from sliding along the upper surface 69 of the slat 68. If there are no hook and loop fasteners, it is possible that the magnets will slide off of the slat 68 or the receiving surface 58, unless the side rail has a retaining portion 56 or a raised ridge 60 to abut against the magnets 44, 44' to prevent the magnets 44, 44' from sliding upward on the inclined side rail 32. The retaining portion 56 or ridge 60 can hold magnetic fasteners 44 in place and prevent such magnetic fasteners from moving upwardly with respect to the inclined portion 38 of the side rail 32. For instance, as shown in FIG. 3, if the wind or a heavy object causes the cover 18 to pull away from the side rail 32, the magnet 44 will abut against the ridge 60 of the retaining portion 56, which will largely prevent the sides 20 of the cover 18 from sliding upward with respect to the incline of the side rail receiving surface. It will be appreciated that the preferred side rail 32 shown in partial cross-section in FIG. 3 is an aluminum extrusion and as such is not ferromagnetic. The combination of a ferromagnetic slat 68 and an aluminum or other non-ferromagnetic side rail is believed to be desirable in order to limit the magnetic attraction of the magnets 44, 44' to the slat 68 or to any strips of ferromagnetic material (not shown) on either the upper surface 69 of such a slat or on the receiving surface 58 of the preferred side rail shown in FIG. 3

Preferred tonneau cover assemblies 10 include at least one support member or bow (not shown) that supports the cover 18, for an example, see U.S. Pat. Nos. 5,076,338; 6,543,835 and 7,815,329, the disclosures of which are hereby incorporated herein by reference.

A bottom view of an alternate attachment system is illustrated in FIGS. 4-5. In this embodiment, the cover 18' includes a plurality of connector assemblies 42' each including a magnet 44' and a plastic enclosure 46'. In preferred embodiments, there is one connector assembly 42' for about every 6 to about 8 inches. However, preferably the plastic enclosure 46' fully encloses the respective magnet 44' and provides enough surface area to connect the enclosure 46' to the cover 18'. The side rails 32 (see FIGS. 1-3) are preferably configured as illustrated in FIGS. 2-3 and but for having a slat that only includes a ferromagnetic material to engage the magnets of the connector assemblies to secure the flexible cover to ferromagnetic material of the side rails. It will be understood that the use of a slat in the channel is not necessary and that the receiving surface of the side rail can be made of a ferromagnetic material.

To secure the end plate 70 to the side rails 32, the side rails preferably include a strike or engagement member as are disclosed in U.S. Pat. Nos. 5,076,338 and 6,543,835, the disclosures of which are hereby incorporated herein by reference. The front end plate (not shown) may be secured to the respective side rails 32 in a similar manner to that described for the rear end plate 70 or in a manner similar to those systems described in U.S. Pat. Nos. 5,076,338 and 6,543,835, each of which has been incorporated herein by reference.

Figure 9:
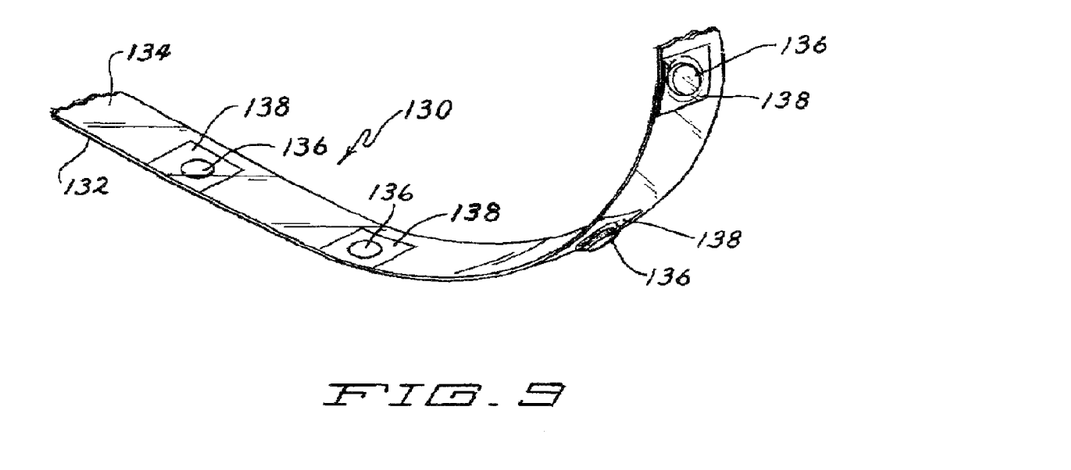
FIG. 9 is a partial, perspective view of a band 130 having two strips of plastic material 132, 134 encasing intermittently spaced magnets 136.
Figure 10:
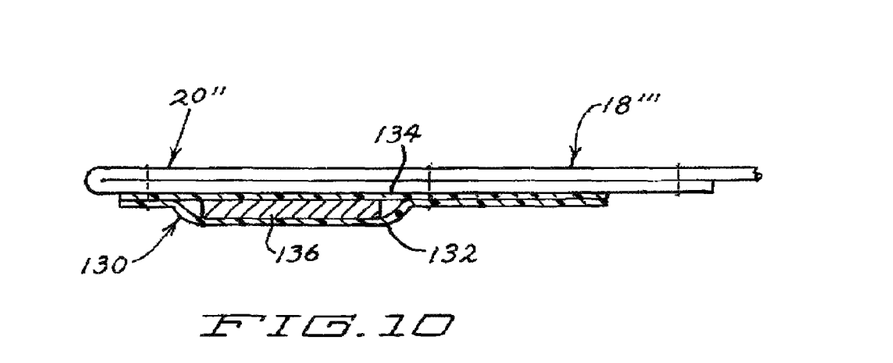
FIG. 10 is an alternate embodiment of a flexible cover 18''' in which the band 130 of FIG. 9 is secured to an underside of the flexible cover 18'''.

Now also referring to FIGS. 9-10, which illustrate further preferred embodiments. As shown in FIG. 9, a band of material 130 has magnets 136 intermittently spaced along its length. In one embodiment illustrated in FIG. 10, the band 130 is preferably sewn onto an underside of a flexible cover 18''' along each latitudinal edge or side 20". In such embodiments, the band 130 is preferably made of two strips of flexible plastic material 132, 134 with magnets 136 intermittently spaced therebetween, preferably from about 4 to about 6 inches apart. The magnets 136 can be secured between the strips of flexible plastic material 132, 134 and secured in place by heat welding or the like. When the magnets 136 are welded to strips of flexible plastic material 132, 134, the weld will typically result in a weld section 138 in which the strips of flexible plastic material 132, 134 are joined. It will be appreciated that the band 130 may be made of fabric, vinyl or mesh materials, as desired, and also that the magnets may be secured in a variety of ways including welding, sewing, snaps, glue and other fastening methods.

Figure 11:
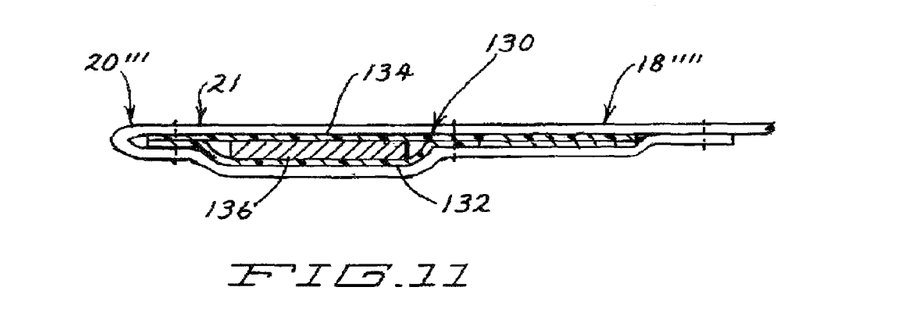
FIG. 11 is another alternate embodiment of a flexible cover 18'''' in which the band 130 of FIG. 9 is secured between a fold in the flexible cover 18'''', such that, once assembled, the band 130 is incorporated into the respective sides 20''' of the cover 18''''.

Similarly, the embodiment of FIG. 11 illustrates a flexible cover 18"" having a band 130 with a plurality of magnetic fasteners 136 secured thereto, spaced preferably about 4-6 inches (only one magnet is visible in this view). The band 130 is positioned within a fold section 21 of the flexible cover proximate each longitudinal side 20''' and then the fold section 21 is generally sealed to enclose the band 130 by welding, sewing or the like. Both of the embodiments of FIG. 10-11 are preferred as they provide corrosion resistance as each magnet 136 is enclosed in a water resistant material (e.g.

strips 132, 134). It will also be appreciated that the placement of magnetic elements may be swapped out for one another in alternate embodiments.

Figure 6:
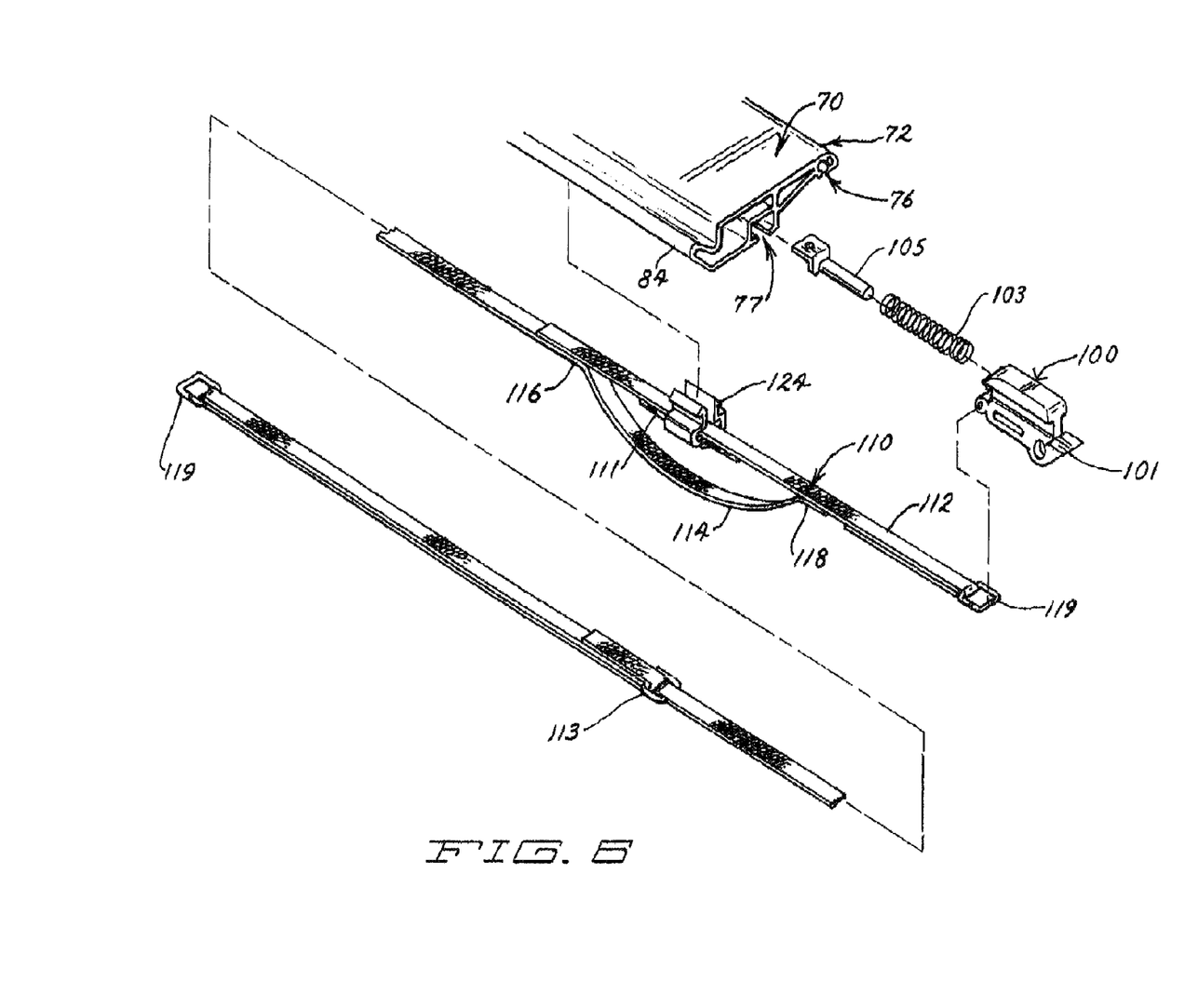
FIG. 6 is a partial, perspective view of an end plate 70 that will be secured to the flexible cover 18 (not shown); the end plate 70 including at least one locking member 100 and a cord 110; wherein the cord 110 includes a loop 114 that can be pulled to actuate movement of the locking members 100.
Figure 7A:
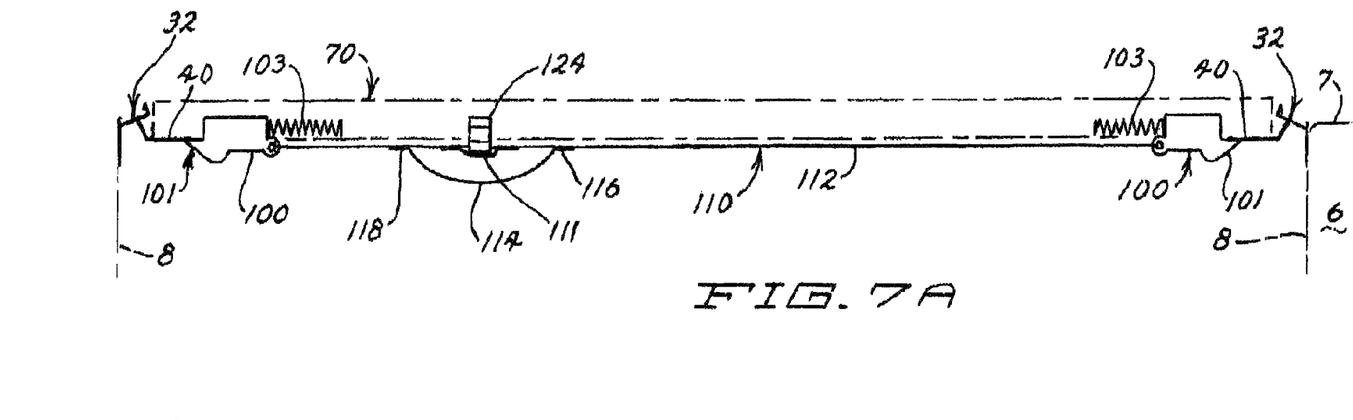
FIG. 7A is a partial, schematic view of the end plate 70 of FIG. 6 having two locking members 100, wherein the locking members 100 are spring biased toward a locked position and can be drawn out of the locked position against the bias with the cord 110 as shown in FIG. 7B.
Figure 7B:
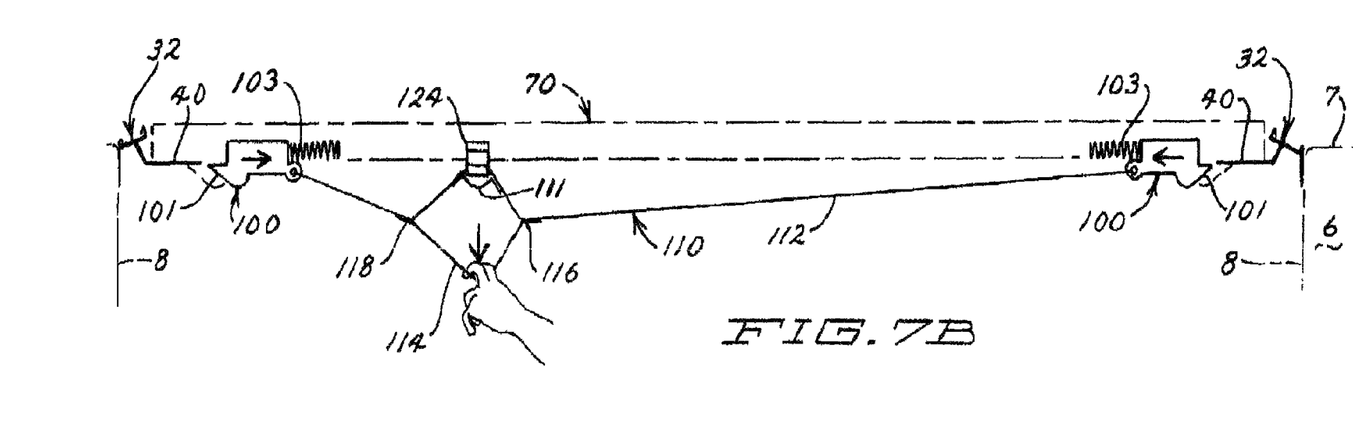
FIG. 7B is a partial, schematic view of the end plate 70 of FIG. 6-7A, illustrating how the loop 114 of the cord 110 can be pulled away from the end plate 70 to draw the locking members 100 away from the side rails 32 against the bias toward the locked position, when the slip clip 124 is slidably secured to the end plate 70 within the channel 77.
Figure 8:
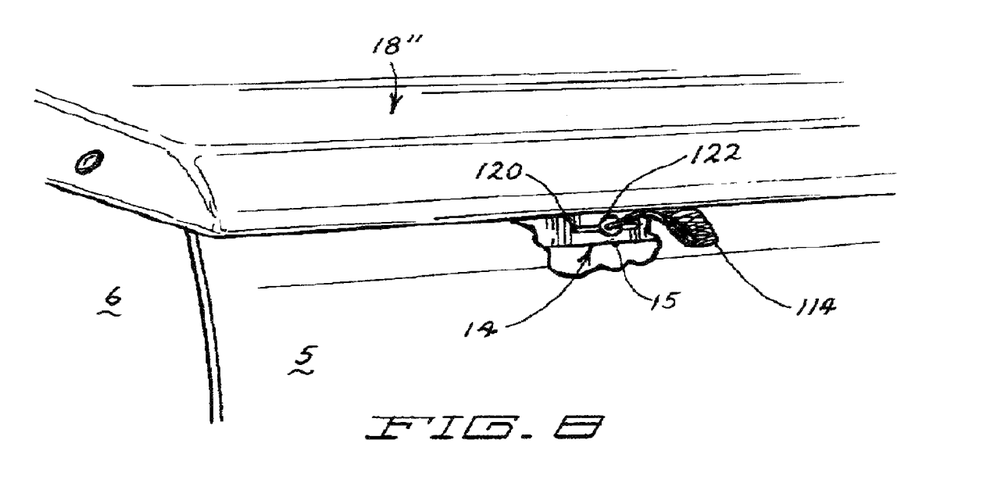
FIG. 8 is an alternate embodiment of a flexible cover 18" in which the loop 114 of FIGS. 7A-B is threaded through a slit 120 in the flexible cover 18" proximate the later edge 14 at the tailgate 5 and held in place with grommet 122.

Now also referring to FIGS. 6-7B, which illustrate a preferred end plate 70 that is used to secure the one end or lateral side 14 of the flexible cover 18 to the cargo box 4. As shown in FIG. 6, the end plate 70 includes a distal edge 72 having a first channel 76, in which a portion of the lateral side 14 of the cover 18 is secured (not shown, see flap 15 at the distal end of the lateral side 14 that is secured in channel 76 (not shown) so that the flap 15 extends down from the end plate to proximate channel 76 in the embodiment shown in FIG. 8). The end plate 70 preferably also includes a second channel 77, which is sized to slidingly receive at least one locking member 100, preferably one proximate each of the respective ends to the end plate 70, each of which is spring biased toward a closed position in which a respective extended finger 101 of the respective locking members 100 reside in a position shown schematically in FIG. 7A, in which the extended fingers 101 extend below an extended portion 40 of the respective side rails 32. The locking member 100 can be of the type disclosed in U.S. Pat. No. 6,534,835, the disclosure of which is incorporated herein by reference. In preferred embodiments, the locking member 100 will be biased toward an extended position shown in FIG. 7A by a spring 103 that is secured to the end plate 70 by an elongated spring engaging member 105 that allows the spring 103 to compress. In preferred embodiments, the second channel 77 is generally T-shaped and will generally extend the entire length of the end plate 70 and a second locking member 100 will be slidingly retained in the channel 77 at the opposite end. When the end plate 70 is rotated or pivoted into a closed position against a pair of end plate engagement members (not shown) on the respective opposing side rails 32, only one of which is shown, a peak or crest 84 of the end plate 70 contacts a pivot point (not shown) of the engagement member or strike (see, for example, U.S. Pat. Nos. 5,076,338 and 6,543,835, the disclosures of which are each hereby incorporated herein by reference).

Various preferred embodiments discussed herein can utilize directional hook fastener (not shown) in place of traditional hook fastener 24. Directional hook fastener includes a plurality of hooks that generally all face the same direction, unlike traditional multi-directional hook fastener that has a plurality of hooks facing multiple directions such that the hooks will engage loop fastener from all angles. In preferred embodiments, the directional fastener is positioned on the receiving surface 46 such that the hooks are uniformly facing the tailgate 12 when the side rail 32 is operatively attached to the sidewall 6. In this position, the hooks will generally not engage the component of hook and loop fastener 22, in this case loop fastener on the cover 18, as the flexible cover 18 is being pulled over the cargo box 4 towards the tailgate 12 (see, in particular, FIGS. 2-3). Use of such directional hook fastener reduces the wear and tear of the components of directional hook fastener and corresponding component of loop fastener 22 on the cover 18. Directional hook fastener can be made, for example, in accordance with the teachings of U.S. Pat. No. 7,172,008 (Vanbenschoten et al.); U.S. Pat. No. 6,640,348 (Clune et al.); or U.S. Pat. No. 6,258,311 (Jens et al.), the disclosures of which are hereby incorporated herein by reference.

The preferred magnets 44, 44' have a holding strength of at least about 5 pounds, more preferably at least about 10 pounds. The use of magnets in the various embodiments described herein is preferred as compared to hook and loop fastener because magnets work better in wet and cold weather. In wet weather, hook and loop fastener gets slippery and in cold weather, hooks are more likely to break.

Preferred tonneau cover assemblies further include an end plate 70 having a cord or strap 110 interconnecting the two spring biased locking members 100. The cord 110 further preferably includes a connecting portion 112, a loop 114 having two ends 116, 118 that are connected to the connecting portion 112. The loop 114 extends outwardly from the connecting portion 112 and can be pulled to move the each of the respective locking members 100 from a first position in which the two respective locking members prevent the end plate 70 from disengaging from the respective end plate engagement members (not shown) to a second position in which the end plate can disengage from the respective end plate engagement members (not shown) as disclosed in U.S. Pat. Nos. 5,076,338 and 6,543,835, the disclosures of which are hereby incorporated herein by reference. In preferred embodiments the length of connecting portion 112 is adjustable at one end where it is doubled over on itself and interconnected by a slip clip 124 that can slide along the connecting portion 112 of cord or strap so that its length can be adjusted so that it can be used for different sized tonneau covers. The amount that the pull loop 114 hangs down is preferably not adjustable by the user, however. The distance between one end 116 of the pull loop 114 and the other end 118 of the pull loop, where the respective ends are attached to the connecting portion 112 is preferably from about 6 to about 10 inches in length, more preferably from about 7 to about 9 inches in length, even more preferably about 8 inches in length. At each end of the cord or strap 110 there is a connector 119, preferably a wire loop, that interconnects the respective ends of the cord 110 to the respective slide locks 100. In other various preferred embodiments, a reinforced slit 120 can be cut or formed in a portion of the cover 18" that extends out of and beyond the first channel 76, such that a portion of the pull loop 114 can extend out the slit 120 for easy access to the loop 114. In such embodiments, the loop 114 will preferably include a grommet 122 or the like to secure the loop 114 within the slit 120 so that the portion of the pull loop 114 that extends out beyond the slit 120 will remain there and not slip back through the slit 120 so as to no longer be accessible proximate the slit 120. In further preferred embodiments, the cord 110 will include a clip 124 that can be inserted within the channel 77 to further secure the cord 110 to the end plate 70. The clip 124 is preferably held in place on the cord 110 by a clip retaining strap 111 that is secured to the connector 112 on each side of the clip 124 so that the clip cannot migrate any significant distance along the cord 110. The clip 124 is designed to be force fit into the channel 77, but to be released from the channel 77 relatively easily when significant force is used to pull on the cord 110. In this way, the clip 124 will be the "weak link" so that the connection between the clip 124 and the end plate 70 will fail before significant force is placed on other connection points between the respective slide locks 100. If the clip 124 fails and pops out of the channel 77, it can be easily snapped back into place in the channel.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A tonneau cover assembly for removable attachment about a top of a perimeter of a cargo box of a pickup truck, the perimeter of the cargo box including a forward end, two opposing sidewalls and a tailgate, the tailgate being positioned rearward of the forward end and having an open position and a closed position, the tonneau cover assembly comprising:
   a cover;
   a support frame for attachment to the cargo box, the support frame having two opposing side rails, each of which can be secured to one of the respective opposing side walls; and
   a securing plate having first and second ends, the securing plate being attached to the cover, the securing plate being engageable with the respective side rails to secure the cover to the support frame; wherein the securing plate includes a channel proximate one end of the securing plate; a locking member positioned at least partially within the channel proximate the one end; and a draw cord connected to the locking member; wherein the draw cord further includes a pull loop having two ends, each of the respective ends being connected to the connecting portion of the draw cord;
   wherein the securing plate is prevented from disengaging from the respective side rail when the locking member is in a first position and the securing plate is secured to one of the respective side rails; wherein the locking member is biased toward the first position; and wherein the securing plate can disengage from the respective side rail when the respective locking member is in a second position; wherein the locking member can be moved from the first position to the second position by pulling the pull loop away from the securing plate.

2. The tonneau cover assembly of claim 1, wherein the cover is flexible.

3. The tonneau cover assembly of claim 1, wherein the pull loop extends through the cover proximate the securing plate.

4. The tonneau cover assembly of claim 1, wherein each of the locking member is biased with a spring.

5. The tonneau cover assembly of claim 1, wherein the respective ends of the pull loop are connected to a connecting portion of the draw cord at spaced apart locations.

6. The tonneau cover assembly of claim 5, wherein the pull loop has a length of from about 6 to about 10 inches.

7. The tonneau cover assembly of claim 1, further comprising two loops that interconnect the respective ends of the cord to the slide lock.

8. The tonneau cover assembly of claim 7, wherein a length one of the loops is adjustable so that a length of the cord is adjustable.

9. The tonneau cover assembly of claim 1, wherein the cord further includes a clip that can secure the cord to the securing plate proximate the channel.

10. The tonneau cover assembly of claim 9, wherein the clip can be deformed so as to be force fit force fit into the channel.

11. The tonneau cover assembly of claim 9, wherein the draw cord includes a clip retaining strap which having two ends, each of the two ends being connected to the draw cord in spaced apart locations so that the clip is unable to slide away from its initial position along the draw cord beyond either of the two spaced apart positions.

12. A tonneau cover assembly for removable attachment about a top of a perimeter of a cargo box of a pickup truck, the perimeter of the cargo box including a forward end, two opposing sidewalls and a tailgate, the tailgate being positioned rearward of the forward end and having an open position and a closed position, the tonneau cover assembly comprising:
a cover;
a support frame for attachment to the cargo box, the support frame having two opposing side rails, each of which can be secured to one of the respective opposing side walls; and
a securing plate having first and second ends, the securing plate being attached to the cover, the securing plate being engageable with the respective side rails to secure the cover to the support frame; wherein the securing plate includes a channel and a locking assembly, the locking assembly including a locking member positioned at least partially within the channel and a draw cord including a connecting portion connected to the locking member; wherein the draw cord further includes a clip that can removably secure the draw cord to the securing plate proximate the channel;
wherein the securing plate is prevented from disengaging from the respective side rail when the locking member is in a first position and the securing plate is secured to each of the respective side rails; wherein the locking member is biased toward the first position; and wherein the securing plate can disengage from the respective side rails when the locking member is in a second position; wherein the locking member can be moved from the first position to the second position by pulling the draw cord away from the securing plate.

13. The tonneau cover assembly of claim 12, wherein the cover is flexible.

14. The tonneau cover assembly of claim 12, wherein the draw cord includes a pull loop having two ends, each of the respective ends being connected to the connecting portion.

15. The tonneau cover assembly of claim 14, wherein the respective ends of the pull loop are connected to the draw cord at spaced apart locations.

16. The tonneau cover assembly of claim 14, wherein the pull loop extends through the cover proximate the securing plate.

17. The tonneau cover assembly of claim 12, wherein the locking member is biased with a spring.

18. The tonneau cover assembly of claim 12, wherein the pull loop has a length of from about 6 to about 10 inches.

19. The tonneau cover assembly of claim 12, wherein the clip can be deformed so as to be force fit into the channel.

20. The tonneau cover assembly of claim 12, wherein the draw cord includes a clip retaining strap which having two ends, each of the two ends being connected to the draw cord in spaced apart locations so that the clip is unable to slide away from its initial position along the draw cord beyond either of the two spaced apart positions.

21. The tonneau cover assembly of claim 12, further comprising two slide locks and two loops that interconnect the respective ends of the cord to the respective slide locks.

22. The tonneau cover assembly of claim 21, wherein a length one of the loops is adjustable so that a length of the cord is adjustable.

23. A tonneau cover assembly for removable attachment about a top of a perimeter of a cargo box of a pickup truck, the perimeter of the cargo box including a forward end, two opposing sidewalls and a tailgate, the tailgate being positioned rearward of the forward end and having an open position and a closed position, the tonneau cover assembly comprising:
a cover including an opening proximate the tailgate when the tonneau cover assembly is operatively secured to the pickup truck;
a support frame for attachment to the cargo box, the support frame having two opposing side rails, each of which can be secured to one of the respective opposing side walls; and
a securing plate having first and second ends, the securing plate being attached to the cover, the securing plate being engageable with the respective side rails to secure the cover to the support frame; wherein the securing plate includes a channel and a locking assembly, the locking assembly including a locking member positioned at least partially within the channel and a draw cord connected to the locking member; wherein the draw cord at least partially extends through the opening in the cover;
wherein the securing plate is prevented from disengaging from the respective side rail when each of the respective locking members are in a first position and the securing plate is secured to each of the respective side rails; wherein the locking member is biased toward the first position; and wherein the securing plate can disengage from the respective side rails when the locking member is in a second position; wherein the locking member can be moved from the first position to the second position by pulling the pull loop away from the securing plate when the securing plate is engaged with the side rails and the locking member is in the first position.

24. The tonneau cover assembly of claim 23, wherein the cover is flexible.

25. The tonneau cover assembly of claim 23, wherein the opening is a slit.

26. The tonneau cover assembly of claim 25, wherein the draw cord includes a pull loop; wherein the tonneau cover assembly further includes a grommet secured to the cover proximate the slit and the pull loop passes through the slit and the grommet so that the pull loop can be pulled in order to disengage the securing plate.

27. The tonneau cover assembly of claim 23, wherein the locking member is biased toward the first position with a spring.

28. The tonneau cover assembly of claim 23, wherein the draw cord includes a pull loop having two ends, wherein the respective ends are connected to the draw cord in spaced apart locations.

29. The tonneau cover assembly of claim 23, wherein the draw cord includes a pull loop; wherein the pull loop has a length of from about 6 to about 10 inches.

30. The tonneau cover assembly of claim 23, further comprising two slide locks and two loops that interconnect the respective ends of the draw cord to the respective slide locks.

31. The tonneau cover assembly of claim 30, wherein a length one of the loops is adjustable so that a length of the cord is adjustable.

32. The tonneau cover assembly of claim 23, wherein the cord further includes a clip that can secure the cord to the securing plate proximate the channel.

33. The tonneau cover assembly of claim 32, wherein the clip can be deformed so as to be force fit force fit into the channel.

34. The tonneau cover assembly of claim 32, wherein the draw cord includes a clip retaining strap which having two ends, each of the two ends being connected to the draw cord in spaced apart locations so that the clip is unable to slide away from its initial position along the draw cord beyond either of the two spaced apart positions.

* * * * *